United States Patent [19]

Leib

[11] Patent Number: 4,980,922

[45] Date of Patent: Dec. 25, 1990

[54] SYSTEM FOR OUTPUT PLANE CALIBRATION OF AN OPTICAL CORRELATOR

[75] Inventor: Kenneth G. Leib, Wantagh, N.Y.

[73] Assignee: Grumman Aerospace Corporation, Bethpage, N.Y.

[21] Appl. No.: 200,599

[22] Filed: May 31, 1988

[51] Int. Cl.$^5$ .............................................. G06K 9/00
[52] U.S. Cl. ..................................... 382/31; 382/42; 350/3.82; 350/162.13; 250/396 R
[58] Field of Search ............................. 382/31, 30, 42; 350/3.82, 162.12, 162.13, 3.77; 356/392; 250/396 R

[56] References Cited

U.S. PATENT DOCUMENTS

| | | | |
|---|---|---|---|
| 4,174,179 | 11/1979 | Tschudi et al. | 350/3.77 |
| 4,371,264 | 2/1983 | Lacombat et al. | 350/162.12 |
| 4,462,046 | 7/1984 | Spight | 350/162.13 |
| 4,490,849 | 12/1984 | Grumet et al. | 382/31 |
| 4,637,056 | 1/1987 | Sherman et al. | 382/31 |
| 4,655,542 | 4/1987 | Dube | 350/3.82 |
| 4,763,004 | 8/1988 | Yasuda et al. | 250/396 R |
| 4,772,101 | 9/1988 | Liu | 382/31 |
| 4,809,340 | 2/1989 | Mersereau | 382/31 |

OTHER PUBLICATIONS

"Accurate Position Detection of Targets in Noise Image", Optics Communications vol. 54, No. 6, pp. 323–326, 1985.

"Robotic Vision, Tray-Picking System Design Using Multiple, Optical Matched Filters," SPIE vol. 638, Hybrid Image Processing (1986), pp. 2–8.

Investigation and Implementation of optical Memory for a Correlator Seeker Re-670, 1983, Grumman Research and Development Center Report.

Investigation of Large Capacity Optical Memories for Correlator Applications Re-634, 1981, Air Force Office of Scientific Research.

Aperture Tapering in a Coherent Optical Correlator, RM-976, 1984 Research and Development Center.

*Primary Examiner*—Leo H. Boudreau
*Assistant Examiner*—Yon Jung
*Attorney, Agent, or Firm*—Scully, Scott, Murphy & Presser

[57] ABSTRACT

A system for calibrating the output correlation plane of an optical correlator for positional and nonlinearity information to determine the position of an input image in an input image plane of the optical correlator. The optical correlator operates on the principle of projecting the Fourier transform of an input image onto at least one matched filter having recorded thereon the Fourier transform hologram of an image of interest. The inverse Fourier transform of the correlated optical signal is then projected onto a detector to determine the correlation of the input image with the image of interest. A calibration image is positioned in the input image plane of the optical correlator, and includes a two dimensional array of substantially identical targets, with the precise location of each identical target in the input image plane being known. At least one matched filter is placed in the optical correlator, and has recorded thereon the Fourier transform hologram of the identical target. The positions of the resultant optical signals in the output correlation plane are then correlated with the position of the two dimensional array of identical targets in the input image plane to calibrate the output correlation plane of the optical correlator for positional information and nonlinearity. The calibration system of the present invention enables an optical correlator system to be precisely calibrated in a way that the system can continue to operate using the same optical computing array. The calibration system can be used with any prescribed input format, e.g. 35 mm, 70 mm, 5", etc.

13 Claims, 6 Drawing Sheets

SYSTEM FOR OUTPUT PLANE CALIBRATION OF AN OPTICAL CORRELATOR

BACKGROUND OF THE INVENTION

1. Field of the Invention

The present invention relates generally to a system for calibrating the output plane of an optical correlator for positional information and nonlinearities therein. More particularly, the subject invention pertains to such a calibration system which enables appropriate positional calibration targets to be generated and utilized with a high degree of precision of location between an input image and the output plane of the optical correlator.

2. Discussion of the Prior Art

An optical correlation system is disclosed in U.S. patent application Ser. No. 814,209, filed Dec. 27, 1985, now abandoned and refiled in U.S. patent application Ser. No. 236,519, relative to which the output plane correlation system of the present invention was developed. The optical correlation system disclosed therein optically compares an input image with optical information stored in multiple matched filters to provide identification and aspect information about the input image. In one disclosed embodiment, the input image is directed onto a spatial light modulator to spatially modulate a coherent beam of radiation. The spatially modulated radiation beam is directed onto a multiple holographic lens which performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs an inverse Fourier transformation on each optical correlation output, which is directed to an output correlation plane. A detector at the output correlation plane then detects the optical correlation outputs, and a processing circuit determines identification and aspect information about the input image.

One problem with this type of optical correlator is that of calibrating with precision the output correlation plane for positional information and nonlinearities therein relative to the position of input images in the input image plane. Such calibration should also enable a determination of the output field nonlinearities to arrive at a compromise on the position of an input image frame or the position of one input target if the output field is not linear.

Suemoto and Ohara disclose in "Accurate Position Detection of Targets in Noise Image", Optics Communications, Vol. 54, July 15, 1985, the use of circular rings placed in an image frame, and one placed just outside of the image frame, to make a matched filter for the circles, and then relate the correlation plane spots to the input plane spacings for measurements.

This publication illustrates an input plane image in which rings 1-3 are placed in the frame and a ring 0 is placed outside the normal frame. The various distances 0-1, 1-3, 2-3,....are measured with precision A matched filter is made of a ring placed on axis. Upon playing the input frame back, the correlation plane shows four bright spots A-D, corresponding to the rings, 0-3. Measurement of the distance A-B (=d) corresponds to the distance between the circles 0-1, and careful measurement of either circle 0 or circle 1 to the frame edge, enables the edge to be properly located in the correlation plane image. This approach is utilized because on playback, the sharp frame edge gives an "edged effect" in the correlation plane consisting of an oscillatory variation in intensity where the edge is, and an outward shift in edge location. These effects give rise to edge uncertainty, an important anomaly when aerial reconnaissance imagery is being processed and reference positions are desired.

Suemoto and Ohara do not indicate the degree of spatial frequency cut-off, and so it is not clear that the location of the edge is obtained to the highest degree possible. Accuracy that is achieved is given as ±1.8%. Greater accuracy can possibly be achieved with higher pass matched filters as the correlation spikes tend to get smaller and sharper. Thresholding to a higher level should also increase accuracy. The author does not indicate an awareness of these factors nor an ability to calibrate without changing the matched filter, which operation always alters the alignment in the optical correlator, which presents alignment problems for subsequent usage of the correlator.

In summary, this approach is effective to some extent for determining spatial distances, but introduces concurrent alignment problems. Also, several constraints limit the use of this prior art technique. Most obvious is that in many applications of an optical correlator as described herein the input imagery has highly colored noise and nonsymmetrical targets. Other commercial applications such as robotics provide the opportunity for a well controlled background.

Moreover, it is not always possible or desirable to change the matched filter in the system from a calibrating target MF to a MF required for targets to be anticipated in actual industrial or commercial usage of the optical correlator as this normally requires recalibration of the optical correlator. This is most pertinent when the optical correlator system uses a MHL. The requirements for the alignment of a large MHL array are manageable, but the aligned components of the system should not be moved around any more than necessary. Thus a calibration system for the present invention should use a working matched filter, i.e. one for an image of an object anticipated to be encountered in actual industrial or commercial usage of the optical correlator.

Next, full frame imagery is most frequently encountered in commercial and industrial applications and thus, a portion of the frame cannot use a calibration signal extending beyond the frame. This means, for example, that a 35mm format size (35mm ×24mm) is the format size for which the system, including optics, is designed. Anything beyond the format is excluded.

Finally, the calibration target could be one of the targets included in the memory bank, which ties in with the second constraint. In addition, the definitions for distance would be established by the signals in the correlation plane one must deal with.

SUMMARY OF THE INVENTION

Accordingly, it is a primary object of the present invention to provide a system for calibrating the output correlation plane of an optical correlator for positional information and nonlinearities therein relative to images in the input plane. The nonlinearities and other positional changes in the output plane are frequently caused by the optics of the optical correlator, and show up and are measured in the output plane.

Another object of the present invention is to provide a system for measuring and quantifying the nonlinearities (if any) of the output plane of an optical correlator to allow an approximate determination of the output plane boundaries and the positions of targets therein.

A further object of the subject invention is the provision of a calibration system as described which enables appropriate calibration targets to be generated with a high degree of precision of location.

An additional object of the present invention is to provide a calibration system as described which enables an output correlation plane to be precisely calibrated in a manner such that the optical correlator system can continue to operate using the matched filter memory of the optical computing array. The arrangement enables appropriate calibration targets to be generated with high precision of location. The calibration system can be used with (and is not restricted to) any prescribed input format, e.g. 35mm, 70mm, 5", etc.

In accordance with the teachings herein, the present invention provides an arrangement and a method for calibrating the output correlation plane of an optical correlator for positional information and nonlinearities therein to determine the position of an input image received by the optical correlator. The optical correlator operates on the principle of projecting the Fourier transform of an input image onto at least one matched filter having recorded thereon the Fourier transform hologram of an image of interest. An inverse Fourier transform of the correlated optical signal is then projected onto a detector to determine the correlation of the input image with the image of interest. A calibration image is positioned at the input image plane of the optical correlator, and contains a two dimensional array of substantially identical targets, with the precise location of each identical target in the input image plane being known. At least one matched filter is placed in the optical correlator and has recorded thereon the Fourier transform hologram of the identical target. The positions of the resultant optical signals in the output correlation plane are then correlated with the positions of the two dimensional array of identical targets in the input image plane to calibrate the output correlation plane of the optical correlator for positional information and nonlinearities.

In one preferred embodiment, the calibration image has one image in the center of the input image plane and a plurality of identical images spaced along both orthogonal directions of the input image plane. Moreover, the plurality of identical spaced images are preferably equally spaced along both the x and y axes of the input image plane. The only practical limit to the number of images is the physical one of fitting them all in the input image plane. Alternatively, the calibration image could present a circular array of targets.

One particularly advantageous feature of the present invention is that the identical images are of an object encountered during actual industrial or commercial usage of the optical correlator, such that a change of the matched filter is not required for actual industrial or commercial usage of the optical correlator. This feature substantially eliminates alignment problems within the optical correlator caused by a changing of the matched filter(s) therein, as are encountered by some approaches suggested by the prior art.

BRIEF DESCRIPTION OF THE DRAWINGS

The foregoing objects and advantages of the present invention for a system for output plane calibration of an optical correlator may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The present invention relates to an optical correlator such as is disclosed and described in U.S. patent application No. 814,209, filed Dec. 27, 1985, which uses a multiple holographic lens (MHL) - multiple matched filter (MMF) array.

A number of elements and concepts relating to the present invention are used frequently in this description and are essential to an understanding of its functioning and general principles of operation, and accordingly the nature and properties of several of those concepts are discussed initially hereinbelow for convenience.

A holographic lens (HL) is made by recording an interference pattern of an expanding point radiation source and a collimated radiation beam, which produces a hologram of a point source. When the holographic lens (after recording and processing, as on film) is illuminated, it recreates the point source, i.e., it functions as a lens. If the recording process is repeated, a series of point source holograms, or a multiple holographic lens (MHL), is recorded on the film.

An optical correlator as described herein utilizes one of several possible distributions in offset angle, position and focal length in a multiple holographic lens array to produce an array of Fourier transforms of an input spatially modulated, laser beam. In general, the particular requirements of the array are determined by the particular commercial application being addressed. In summary, a holographic lens takes a Fourier transform of a laser beam illuminated scene or target, and a multiple holographic lens takes, simultaneously, a multiple set of Fourier transforms. A multiple holographic lens array is usually used in conjunction with a corresponding array of matched filters created from the MHL.

Prior to operation of such an optical correlator, a matched filter (MF) is fabricated at each point corresponding to one of the MHL focal points. This array of MFs constitutes the optical memory of the optical correlator. The MF can be fabricated for many targets, or for many aspects of one target, or for some combination thereof. In operation, all MFs in the array must be aligned for proper operation.

An optical correlator as described herein uses the sensitivity of a matched filter to object rotation or object scale size. As either of these aspects change (i.e., the object is at a different angle than the one for which the MF is made, or at a different distance, therefore at a different scale size), the correlation signal changes.

Figure 1:
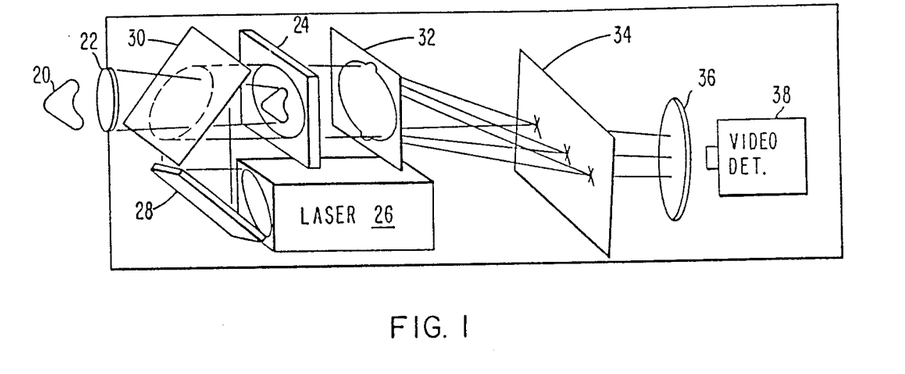
FIG. 1 is a schematic arrangement of an optical correlator employing a multiple holographic lens and a multiple matched filter array therein which can employ the output plane calibration system of the present invention.

FIG. 1 is a schematic arrangement of an optical correlator employing a multiple holographic lens and a multiple matched filter array which can employ the calibration system of the present invention. An object of interest 20 forms an input to the optical correlator, and is imaged by an input lens 22 onto a spatial light modulator (SLM) 24, which spatially modulates the image onto a laser beam from a laser 26, directed thereto by a mirror 28 and beam splitter 30. The spatially modulated laser beam is Fourier transformed by a multiple holographic lens 32 and directed onto a corresponding array of matched filters 34. An inverse Fourier transform lens 36 inversely Fourier transforms the outputs of the matched filters which are then detected by a video detector 38 such as a television camera.

In summary, a matched filter is a Fourier transform hologram with properties that are sensitive to an input object's size, angular aspect and input location. These parameters can be predetermined in order to prescribe a set of angle and range (size) lines covering the anticipated aspects of the object. In the fabrication of a matched filter, the holographic fringe visibility is optimized at a particular spatial frequency that will satisfy the size and/or aspect sensitivity requirements. Because it is unlikely that both requirements can be satisfied simultaneously, a plurality of independent MFs are frequently utilized in an optical correlator. The nature of different particular applications will generally require significantly different MF sensitivities.

Physically, the matched filter can be described by the Fourier transform of the target or input object, the holographic reference beam angle, and the system constant S as follows, $$S = (gF)^{-1} \frac{\text{cycles/mm}}{\text{mm}}$$

where g (mm) and F (mm) are the matched filter construction wavelengths and the FT lens focal length, respectively. The smaller the value of S, the easier it is to control parametric variation sensitivity, and locational problems also ease with smaller values of S.

A second important MF factor is the spatial frequency bandwidth. Matched filters can be optimized at any desired frequency, but the degree of object discrimination is dependent upon the fine details of the object and, thus, the higher frequencies. The frequency requirements must be considered along with the particular object's size, position, and aspect.

Figure 2:
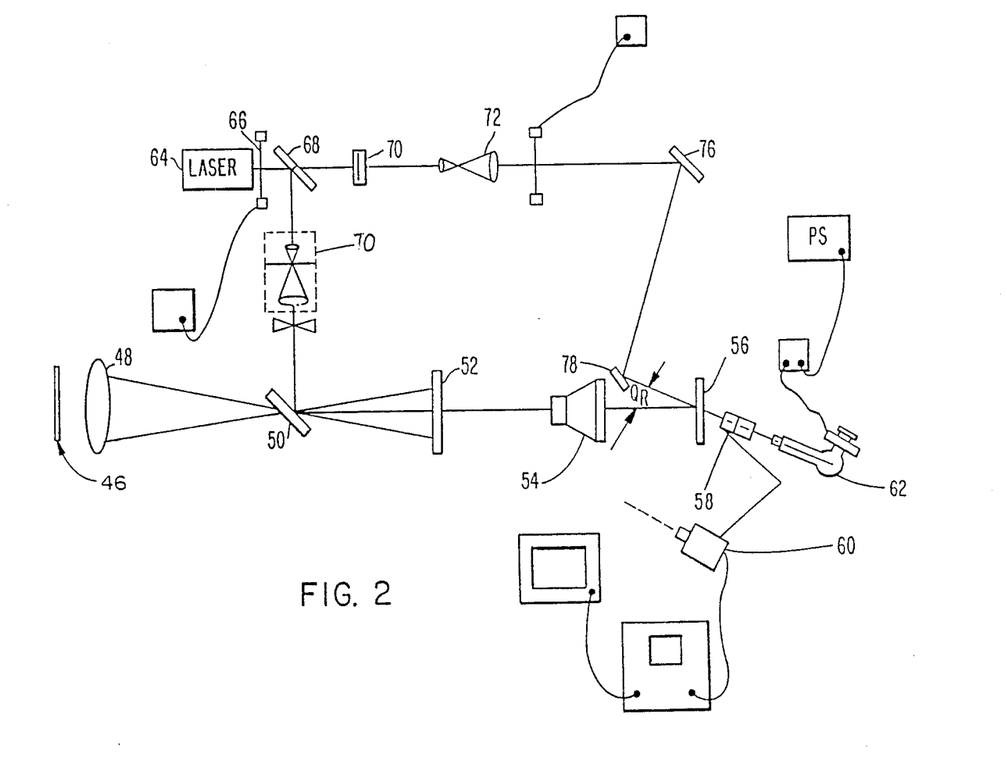
FIG. 2 illustrates a similar optical correlator which might be utilized in a laboratory environment, and which is suitable for fabricating matched filters and also for calibrating the output correlation plane for positional information to determine the precise position of an input image thereto.

FIG. 2 illustrates a schematic arrangement for an optical correlator as might be used in a laboratory environment, and which is suitable for fabricating matched filters and also for calibrating the output correlation plane for positional information therein and linearity relative to correlated images in the input plane. The optical correlator includes both a signal channel and a reference channel. The latter is used to construct matched filters of targets of interest, and is thereafter removed from use by a reference beam shutter which is closed.

In the arrangement of FIG. 2, an input image 46 is focused by an optical system 48 onto a spatial light modulator 52 after passing through a beam splitter 50, which also directs a collimated coherent laser beam onto the spatial light modulator. The output from the spatial light modulator 52 is directed onto a Fourier transform lens 54, which passes the Fourier transform output of the input image onto a matched filter 56 for correlation with the Fourier transform hologram recorded thereon. The correlated output therefrom is then passed through an inverse Fourier transform lens 58 to appropriate detectors, which are illustrated as a television camera 60 and a scanning microscope 62. Both the television camera 60 and the scanning microscope 62 require calibration in a manner as taught herein.

The schematic arrangement also includes a laser source 64, which passes through an exposure control gate 66 to a beam splitter 68, which directs a portion thereof downwardly to a collimator 70 which directs the collimated coherent laser beam onto beam splitter 50 as described hereinabove. A second portion of the laser beam passing through beam splitter 68 passes through a liquid gate 70 to a pinhole/collimator 72, through a beam control shutter 74, and is reflected by a first mirror 76 and a second mirror 78 onto the matched filter 56 for operation as described herein.

During usage of the arrangement of FIG. 2 for calibration of the output correlation plane, a calibration image is focused upon the SLM 52 where it is stored. The laser beam from the collimator 70 is reflected by the beam splitter 50 onto the SLM 52 where it is spatially modulated. The FT lens 54 then takes the Fourier transform thereof and presents it to the stored target matched filter 56. The correlator then functions in a normal manner to carry out correlation plane calibration.

The use of the SLM 52 in the correlator, instead of the direct usage of films, is an adaptation for use in applications such as robotics which generally requires an SLM-like, image storing device. Thus, there are two main ways the correlator can be used and calibrated according to the present invention: first, with a film image input and secondly with a SLM image input.

Calibration can be somewhat different for a film input and for a SLM. The film can be used to calibrate the SLM if this is practical and if the calibration image in this situation is fully imaged upon the SLM, then calibration proceeds as described herein. If the input calibration image overfills the SLM, then the central target image must be identified to determine the linear constant in order to establish the linear dimension on the SLM. This case occurs because the SLM is often, in the present state of the art, of lower resolution than the input image. Thus, to overcome this limitation, the input image is enlarged to overfill the SLM.

Figure 12:
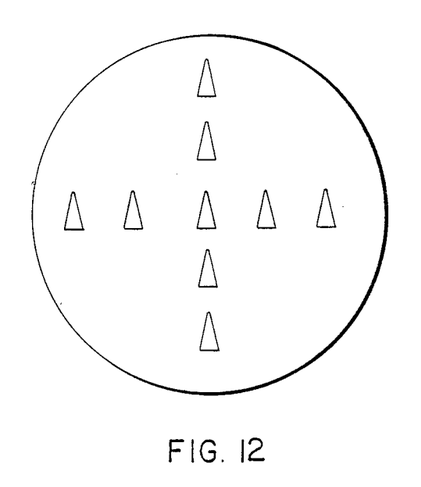
FIG. 12 illustrates a second embodiment of a calibration image array having a circular shape, such that it is particularily suitable for an optical instrument having a circular input aperture such as is presented by a spatial light modulator.

Since most commercially available SLM's have a round input aperture and standard input images are square or rectangular, an accommodation must be reached: either overfill, or image the input entirely upon the SLM. A third approach is to have a circular input image as illustrated in FIG. 12.

The information derived from the optical correlator output includes position and velocity vector, although in fact an important corollary is often missing, a positionally dependent information reference. While velocity can be an independent variable, a position dependent "first look" may require knowledge of the absolute position of the input image.

Little has apparently been done to quantify or reorder a standard for the output planes of optical correlators, but as correlators are applied to such areas as robotics and vehicle guidance, the need to tie position to a reference assumes more significant importance. The reference itself could relate solely to the input image, or to some systems foresight, or perhaps through the input image-setting foresight. A further complication is the differentiation arising between the needs of photographic input imagery and the demands of a real time input through such input devices as spatial light modulators, such as the difference between rectangular standard images and round input apertures in SLMs as discussed hereinabove.

A typical output from an optical correlator yields bright spots representing an auto-correlation of an input image with the Fourier transform hologram stored in a matched filter. However, information on the exact location of an input image edge is missing or even a standard which may be applied to fixing the exact position of other targets. Edge uncertainty is one of the problems encountered with such optical correlators, and particularly when using an SLM. When the input image is directed through an aperture, one obtains an edge movement and an edge ringing caused by diffraction by the edges of the aperture. While the first must be dealt with, the latter can be mitigated somewhat through various edge fall-offs, provided they can be implemented for a particular system.

Thus, the calibration problem can be summarized as target position uncertainty, an imprecise edge reference, and an indefinite degree of linearity observed in the output field. Any standard or calibration system must address these factors if the optical correlator is to provide quantified geometrical data.

CORRELATION PLANE CALIBRATION

Calibration of the output correlation plane entails the establishment of a one to one relationship between locations of targets in the input image plane to the locations of the same targets in the output correlation plane. It is more than determining the optical magnification between the two planes. The sizes of the two planes are in fact generally different, for in an optical correlator as described herein the Fourier Transform (FT) lens determines object-FT size, and the inverse FT lens determines the correlation plane size. The optical magnification or demagnification based upon the lenses can be readily determined.

Because of the "edge effect" caused by diffraction by an input aperture stop, the edge location shifts outwardly and has a ringing effect. Thus, the precise location of the input image stop at the output is uncertain. The edges in the output correlation plane which correspond to the image edges might be located, based on magnification only. However, any nonlinearities in distance measurements must also be taken into account, which arise in either the optical or electronic systems of the correlator. Finally, account must be taken of the type of detector used to record the output correlation plane and subsequent pixel representations of the correlation signals.

Figure 3:
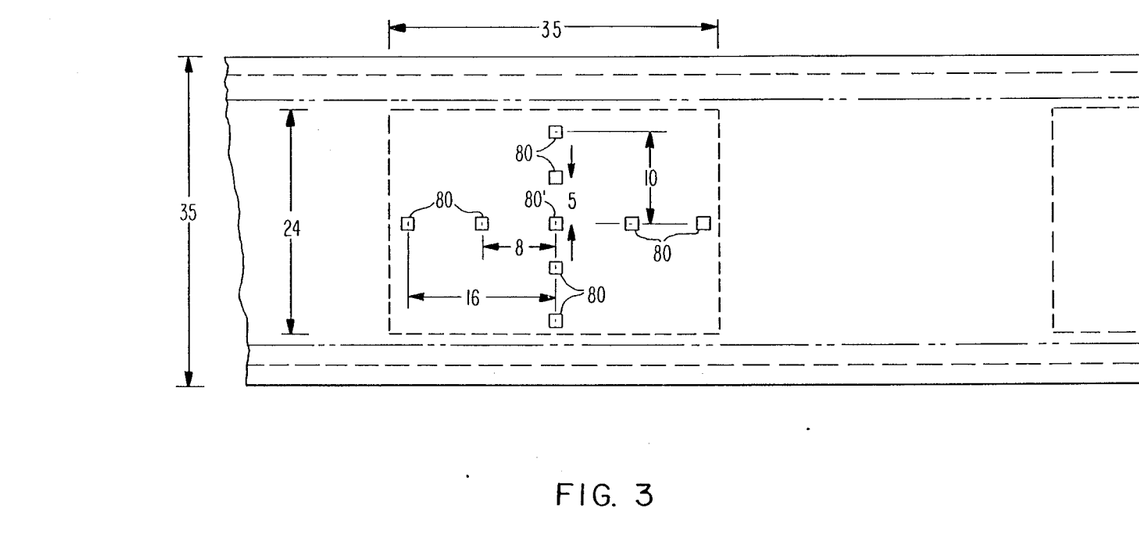
FIG. 3 illustrates a representative calibrated array of images for the input plane of an optical correlator which is suitable for calibrating the output plane thereof for positional information relative to the array of input images.

FIG. 3 illustrates a representative embodiment of a calibrated array of images 80 for the input plane of an optical correlator which is suitable for calibrating the output plane of the optical correlator for positional information relative to the array of input images. The array consists of five images 80 spaced along the abscissa, and five images 80 spaced along the ordinate, with one common image 80 at the center of the coordinate system. The embodiment of FIG. 3 is representative only and more or less images in other uniquely chosen distributions might be used in alternative embodiments. The calibrated array of images should be within the confines of the usable input image, such as a 24×35mm format for 35mm film.

Figure 4:
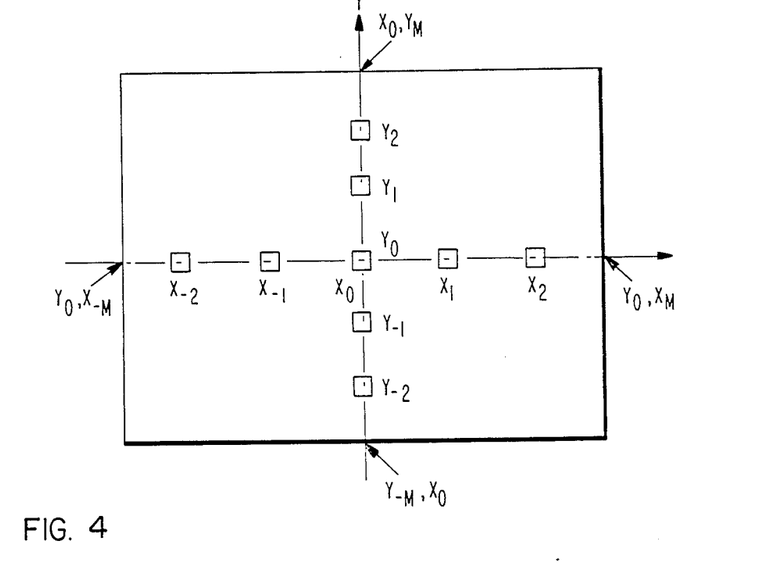
FIG. 4 and 5 illustrate the relationship of the array of images in the input plane, FIG. 4, relative to the correlation signals generated in the output correlation plane, FIG. 5.
Figure 5:
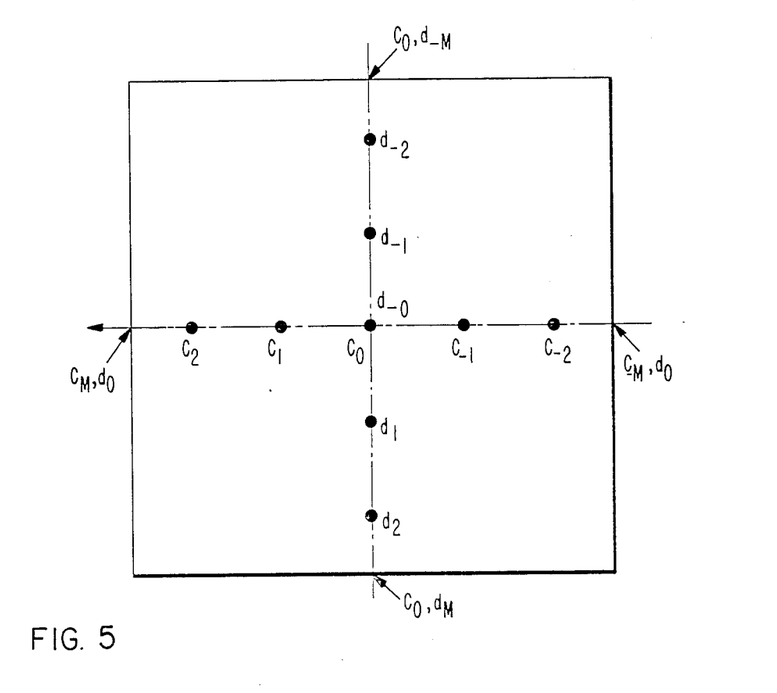

FIGS. 4 and 5 illustrate the relationship of the array of images in terms of their x and y coordinates in the input plane, FIG. 4, relative to the correlation signals c, d generated in the output correlation plane, FIG. 5.

The seeming reversal of axes in FIG. 5 arises from the mathematics of taking two Fourier transforms. The first is taken by the Fourier transform lens and the second is taken by the inverse Fourier transform lens. The result is that a target in the upper right quadrant of the input image shows up in the lower left quadrant of the output plane. This inversion does not adversely impact upon the calibration function as described. If there is a nonuniformly distribution in the calibration input targets along the +x axis, the output correlation spots will show up nonuniform on the −x axis. A similar inversion takes place along the y axis.

Pursuant to the teachings of the present invention, calibration of the output correlation plane can be achieved by establishing a special input image which contains an array of images of a target, with all elements of the array being identical. Spacing between targets, and between specified targets and the edge(s), is known with precision. This input image is generated so as to be consistent with the size and format of the film to be processed by the correlator. Thus, with 35mm film, the special targets could be prepared on the leader of the film undergoing processing, or a comparable size film as the case may be. In some cases, the film would have a fixed format, in others it would perhaps vary or be quite large as in panoramic film. Table 1 illustrates several of these. The $X_0$ dimension is along the film, and the $Y_0$ dimension is transverse to the film.

TABLE 1

Representative Film Formats
FORMAT LIMITS

| FILM TYPE $X_0$ | $X_0$ | $Y_0$ |
|---|---|---|
| 35 mm | 35 mm | 24 mm |
| 70 mm (Panoramic) | 9½ inches | 2¼ inches |
| 70 mm | | |
| 5 inches (Panoramic) | 4½ inches | 4½ inches |
| 5 inches | 44.1 in. | 4½ inches |
| 9½ inches | 9 inches | 9 inches |
| | 18 inches | 9 inches |

For purposes of this explanation, a 35mm format is used in a representative embodiment. FIG. 3 illustrates one possible layout for the calibration image. Guidelines for setting up such an image are:

1. one target should be in the center, which establishes an (imaginary) set of orthogonal axes.
2. all targets should be exactly alike, and they should also be of an image in the working matched filter.
3. targets should be distributed along orthogonal directions in which linearity is desired. Equal spacing for computational ease is also probably desired.
4. the target must be one which is expected to be encountered in the processing run, as a prime purpose of calibration as described herein is not to have to change matched filters.

FIG. 3 illustrates a distribution of nine targets, all alike, along orthogonal axes bisecting a 35mm ×24mm frame. The targets are shown as 1mm × 1mm squares, but of course would be the actual target encountered, which themselves are of the same order of magnitude in size. It would be desirable to have a target on each side of the frame limits, but this would be outside of the laser illumination area, and in the transverse direction would fall within the film perforation zone.

Having the calibrating image and having fabricated a matched filter of the target of interest, the correlation plane can be calibrated. The sequence of events follows. An appropriate algorithm can be compiled to carry out the computer-interactive tasks, as illustrated generally in the logic flow diagram of FIG. 6.

Referring to FIGS. 3–5, the following sequence is followed for calibration.

Establish $X_0$, $Y_0$ in the Image Plane.

This is done by a precise, physical measure of the image limits, or of the aperture limiting the image.

Establish the origin of the axes, $x_0$, $y_0$ in the Image Plane Presumably this was created at $X_{0/2}$, $Y_{0/2}$ when the calibration image was made.

Establish $c_0$, $d_0$ in the detector and monitor (i.e. in the correlation plane).

Input the image distances.

These are the $(x_i - x_{i\pm 1})$, $(y_i - y_{i\pm 1})$ distances including the edge, $-m \leq i \leq m$.

Align MF, and obtain correlation with the calibration image. Establish an output signal threshold. These need to be immediately below the lowest of the nine signals although if all targets are the same, the correlation signals should be equal.

Measure $(c_i - c_{i\pm 1})$, $(d_i - d_{i\pm 1})$, described hereinbelow on TV processing.

Determine Linearity.

That is, does $\Delta c_i = \Delta c_{i\pm 1}$, $\Delta d_i = \Delta d_{i\pm 1}$ hold. If so, proceed according to A, if not, proceed according to B.

A

Determine the values $\Delta c = k_1 \times$, $\Delta d = k_2 y$

That is, the computer must determine the linear conversion factor between the planes.

Project and establish the points $c_m$, $c_{-m}$, $d_m$ and $d_{-m}$

These are the midpoints of each side of the frame in the correlation plane which correspond to the input frame.

Drive cursor around course.

B

Option 1:

If linearity test shows $\Delta C_i \neq \Delta C_{i\pm 1}$, $= \Delta d_i = \Delta d_{i\pm 1}$ for all i, follow linearity regime for establishing $d_m$, $d_{-m}$ and as follows for $C_m$, $C_{-m}$. (A similar logic applies to the vice versa case.) For the nonlinear case of the C's, proceed as follows.

Perform $$\Sigma(C_i - C_{i\pm 1})/(N-1) = \overline{C_i - C_{i\pm 1}} = \overline{\Delta C}$$

N = number of targets in the coordinate under linearization.

Then using $\overline{\Delta C} = K_1 \Delta x$, establish linear projection of $x_m$, $x_{-m}$. Drive cursor to $x_m$, $x_{-m}$. Establish Frame in C-Plane.

Figure 6:
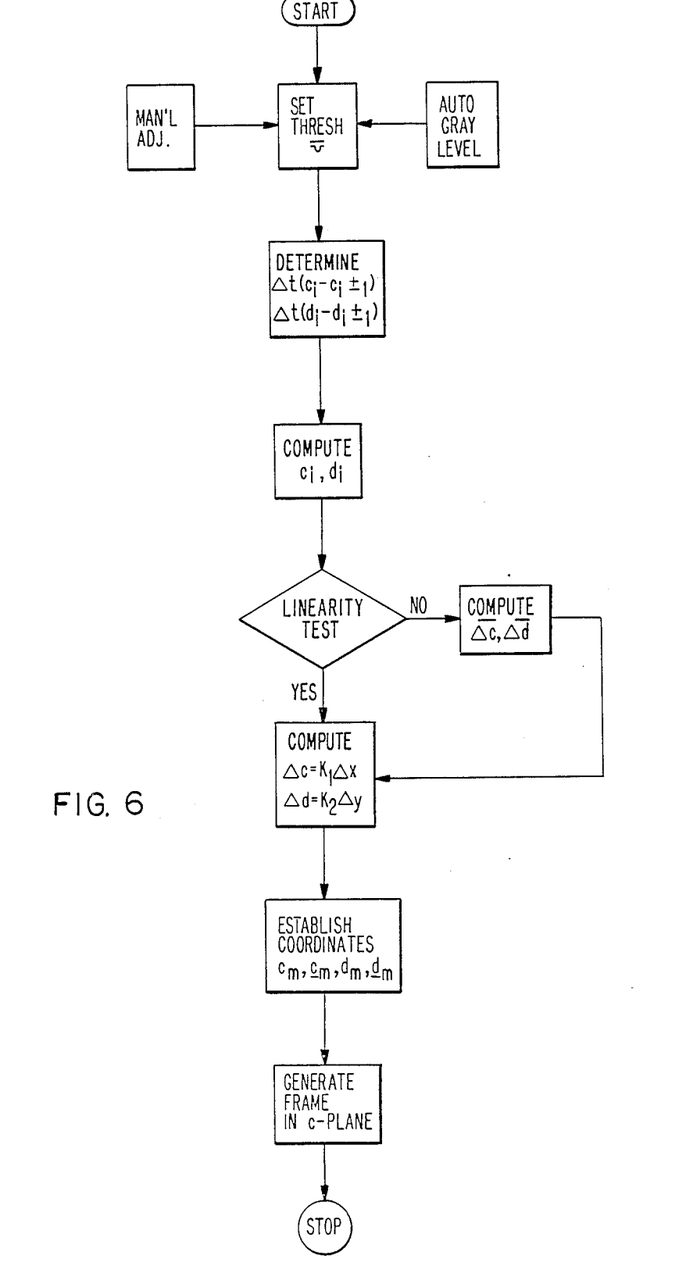
FIG. 6 is a logic flow diagram of software suitable for implementation of calibration of the output plane of an optical correlator for positional information therein.

FIG. 67 is a logic flow diagram of software suitable for implementation of the calibration of the output correlation plane as explained hereinabove. Initially, an output threshold is established, and this could be set manually or with an auto gray level routine as is known in this art. Next, determine $\Delta t$ $(C_i - C_{i\pm 1})$ and $\Delta t$ $(d_i - d_{i\pm 1})$. This allows the computation of $c_i$ and $d_i$. The measurements are next tested for linearity, and if a linear relationship is shown, the values are computed for $\Delta c = K_1 = K_1 \Delta x$ and $\Delta d = K_2 \Delta y$, as explained in A hereinabove. If a nonlinear relationship is established, the nonlinear routine of B hereinabove is followed to compute $\overline{\Delta c}$, $\overline{\Delta d}$. With $\overline{\Delta c}$, $\overline{\Delta d}$ computed, the values are next computed for $\Delta c = K_1 \Delta x$ and $\Delta d = K_2 \Delta y$. Next, the basic coordinates are determined for $c_m$, $c_{-m}$ $d_m$, $d_{-m}$. The calibrated frame is then generated in the output correlation plane.

IMAGE FABRICATION

The practical aspects of the calibration image require a two step process: make a positive print and then copy it onto the film to be analyzed by the correlator, or at least onto film which fits the same correlator film drive mechanism.

The first step requires that the target images be placed in precise locations. This can be achieved by means of an x, y linear coordinate measuring table having stepping motors to provide precise y and x drives, respectively. A round table can be used when angular target motion is required. If the calibration pattern of FIG. 3 is to be generated, then the table is not required. However, the entire device can provide x, y and 0 dimensions to a calibration image.

The actual positive is constructed by mounting photographic paper in a bezel on the device, and then exposing the paper to the desired target image in a sequence of exposure and precise table moves. It is only essential that the bezel table be moved in the correct proportions to those required in the final image. This means that the positive image will be much larger than 35 mm, as an example. This is important since the calibration should be done with film frame size equal to the final operational film frame size. It is possible to do it with different sizes, but precise relative sizes must be known and the insertion location for each should be known.

The table can be driven and controlled typically by a DEC MINC-11 minicomputer, which is a version of the well known PDP-11 series. This computer responds to appropriate algorithms to move the measuring table. In addition, it provides appropriate output signals to drive the stepper motors with precision.

CALIBRATION IMAGE ON A CCD ARRAY

A number of detectors are commercially available which might be considered for a correlator and thus, for the calibration function also. Consider two arrays: a commonly used miniature detector with 384(H) by 491(V) pixels, and a 1024×1024 TV detector.

Consider the input imagery, the 35mm format for the calibration, and perhaps a system in which a 70mm format could be used. The first has frame dimensions of 35mm ×24mm, while the latter has a 57mm square format. The two detectors have formats of 8mm(H) ×6mm(V) and 9MM(H) ×7mm(V), respectively. Thus there are a number of working possibilities when the frames are processed and imaged upon the detectors. These are summarized in Table 2 hereinbelow. They show the characteristics for the two situations in which first, the detector encompasses and detects the entire calibration image through correlation. In the second case, the smaller input dimension encompasses one dimension of the detector. They are both the same case when the calibration input format is square. It is clearly not a desirable situation, but one often encountered when TV formats are used. In the correlator, the magnification arises from the ratio of the (Fourier Transform Lens)/(Inverse FT Lens).

image target, and for the 70mm format, 12×10.2 pixels, showing that the correlation spot would illuminate at least two pixels since such a target typically has a usable correlation spot size of approximately 20% of the target dimension. This leads to at most a 1 pixel error for the smallest calibration target spacing i.e. 5mm, or 3.6, 2.1, 3.0 and 3.2% respectively for the cases above. The other spacings would be less than half of this: 1.5, .88, 1.25 and 1.3. The larger detector would yield even smaller errors primarily because of the higher resolutions given thereby. Thus, the subject invention would be most effective for the larger pixel format of two pixel arrays.

COMPLEX FORMAT CORRELATORS

FIG. 2 illustrates a basic correlator, but the present invention also encompasses more complex arrangements, including different arrangements of multiple holographic lens (MHL) and multiple matched filters (MMF). Arrangements of the MHL and the MMF in the present correlator allow one memory element to cover each of a plurality of different targets aspects, or to cover different targets, or a combination thereof. In this way, regardless of a target's position, it will be detected because the input scene is addressed simultaneously to each aspect and the one which is coincident will enable detection to be made.

Figure 7:
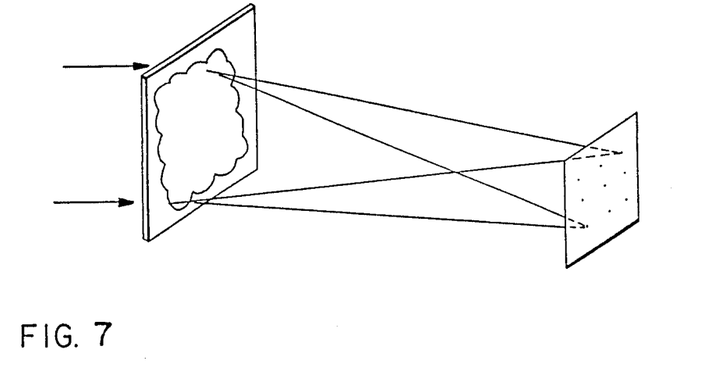
FIGS. 7 and 8 illustrate respectively a multiple holographic lens array (3×3) frequently used in an optical correlator, and a linear array (4×1) multiple holographic lens as might be suitable for robotic applications.
Figure 8:
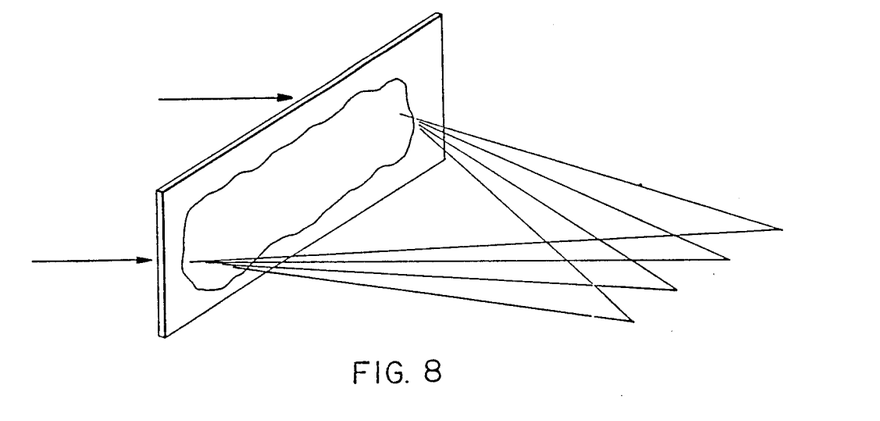

FIG. 7 illustrates a regular 3×3 MHL array frequently used in the present correlator, and FIG. 8 illustrates a 4×1 linear array suggested for use in robotics. Just about any required array can be made and used, depending upon the particular commercial or industrial application.

The output of the matched filter to which the Fourier transform is directed, is itself directed to another lens, the inverse Fourier transform lens in FIGS. 1 and 2. This lens takes another Fourier transform to form the correlation plane at its focal point, which is the output correlation plane referred to herein which is to calibrated and framed. With a single glass inverse transform lens, a single correlation plane is obtained, and all of the previous calibration procedures apply thereto.

However, in some cases the multiple matched filter output may be separated according to target types. Then it may be desirable to have four correlation planes

TABLE 2

| | | DETECTOR ARRAY | | | |
|---|---|---|---|---|---|
| | | 384 (H) × 491 (1) Sony | | 1024 × 1024 VIDEK | |
| FILM FORMAT | PARAMETERS | FULL IMAGE | FULL MINIMUM DIMENSION | FULL IMAGE | FULL MINIMUM DIMENSION |
| 35 MM | IMAGE SIZE (MM) | 8 × 5.5 | 8.75 × 6* | 9 × 6.2 | 10.2 × 7* |
| | MAGNIFICATION | .23 | .25 | .26 | .29 |
| | # PIXELS | 384 × 450 | 384 × 491 | 1024 × 907 | 1024 × 1024 |
| | RESOLUTION $\frac{CY}{MM}$ | 24 × 40.9 | 24 × 40.9 | 56.9 × 73.1 | 56.9 × 73.1 |
| 70 MM | IMAGE SIZE (MM) | 6 × 6 | 6 × 6 | 7 × 7 | 7 × 7 |
| | MAGNIFICATION | .25 | .25 | .29 | .29 |
| | # PIXELS | 288 × 491 | 288 × 491 | 796 × 1024 | 796 × 1024 |
| | RESOLUTION $\frac{CY}{MM}$ | 24 × 40.9 | 24 × 40.9 | 56.9 × 73 | 56.9 × 73 |

*Denotes lost imagery

A typical target of interest that can be used with the present invention would be 2mm×1mm which in the correlation plane (detector) would be n times this dimension or 0.55mm×0.25mm.

Specifically for the smaller detector, the 35mm calibration target would yield 11.0×9.4 pixels for the full which can be addressed onto an n x n detector array and have four (n/2×n/2) arrays. This might be desirable for the 1024 x 1024 detector referred to in Table 2. This would produce four 512×512 arrays, which would give more pixels, hence resolving capability, than the 381×495 pixel detector also referred to in Table 2.

If this four correlator embodiment were used, then each of the four planes could be calibrated simultaneously, subject of course to appropriate modifications in the computer algorithm. There are two ways to accomplish inverse Fourier transforming for four correlation planes, and in the first, four specially designed glass lenses could be nested together to collect the (n/2×n/2) outputs from each group. In the second method, a special MHL inverse Fourier transform configuration would be fabricated to achieve the same purposes.

Figure 9:
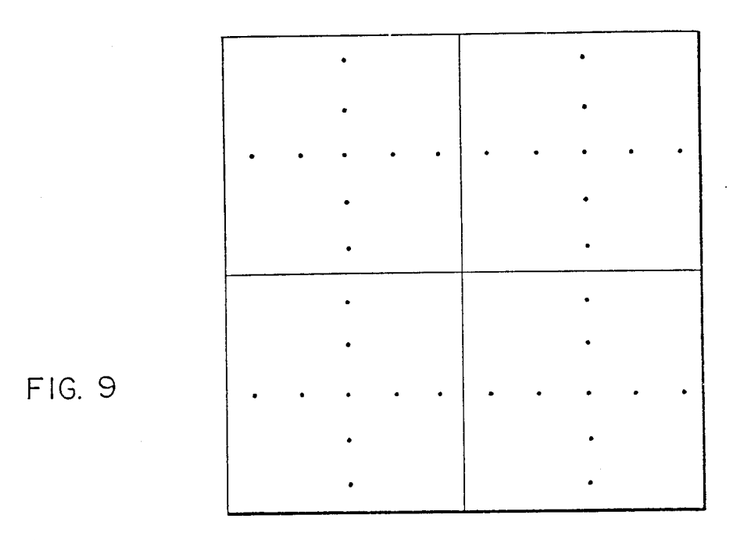
FIG. 9 illustrates an arrangement in which the matched filter output is separated according to different types of input images, and in which the output correlation plane is subdivided into four different output correlation planes.

A monitor whose video signal is derived from the detector would display four correlation planes. Convenience might dictate the use of common sides for the planes. If the calibration image were played through this system, then the output monitor might be similar to that illustrated in FIG. 9.

TESTS WITH CALIBRATION IMAGE

Figure 10:
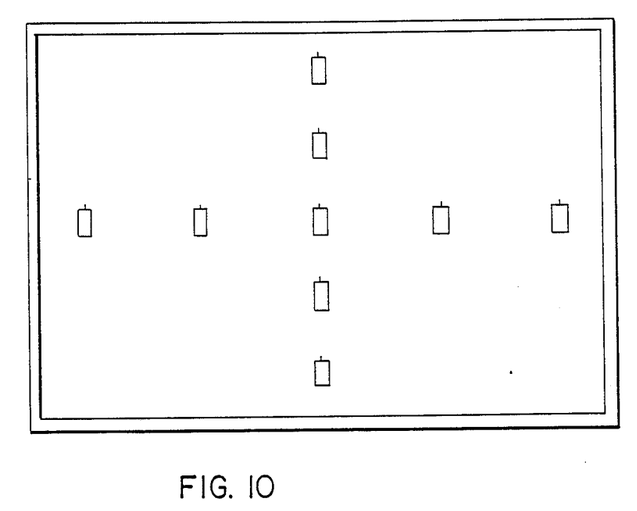
FIG. 10 illustrates one embodiment of a calibration image array which has been actually tested.
Figure 11:
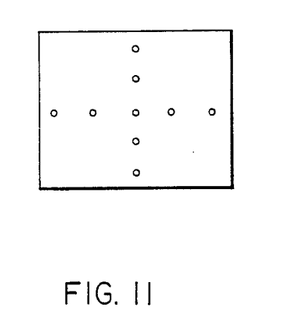
FIG. 11 illustrates the correlation signals obtained in the output correlation plane with the calibration image array of FIG. 10.

FIG. 10 illustrates one embodiment of a calibration image array which has actually been tested, and FIG. 11 illustrates the correlation signals obtained in the output correlation plane with the calibration image array of FIG. 10. FIG. 12 illustrates a second embodiment of a calibration image array designed for a circular input image, suitable for use with a circular input aperture such as are found on many SLMs.

Calibration imagery was prepared in accordance with the arrangement shown in FIGS. 4 and 5. A single image was used, and a linear coordinate table as described hereinabove was used in conjunction with an enlarger to generate the input calibration array, as shown in FIG. 10. An M-60 A1 U.S. Army tank was used as the image, and a photograph was taken of the array on high contrast copy film. The outside border is also illustrated in FIG. 10 to show the full extent of the frame.

The negative was then used to fabricate the matched filter as described hereinabove. The center image was surrounded by a 5.7mm aperture, and a high spatial frequency matched filter was constructed in the usual way, e.g., as in FIG. 2, and appropriately processed. During this processing and in subsequent testing, the film was mounted without a gate, liquid or otherwise. The mounting was such as to keep slightly more than the 2424mm×35mm frame of the 35mm format freely suspended.

After developing and drying the matched filter, the 5.7mm aperture was removed from the input film, and the full frame illuminated.

After processing and drying, the 5.7mm aperture was removed. The illuminating signal beam was larger than the format to allow it to pass the clear edging around the frame. This is the black portion around the frame in the positive of FIG. 10.

Then, the nine targets and frame edge were illuminated and played back through the matched filter.

The result is as shown in FIG. 11, which represents a long exposure with a 1× objective lens to capture the entire result. The rectangular images visible around the bright correlation spots are the outer limits of the M-60, and thresholding could be utilized to eliminate the rectangular images.

The photograph of FIG. 11 portrays the full scope of the Fourier plane correlation:

1—multiple detection (9) of a target using a matched filter of one object (any number of detected targets is possible);

2—target locations indicated at the same positions as the input image with the inversions arising from two Fourier transformations (with symmetrical target arrays the inversion is not discernable);

3—thresholding renders the targets readily detectable; and

4—the edge effect comes through causing uncertainty regarding the actual frame limits.

In the first instance, this is a demonstration for picking out 9 targets, not a remarkable result since if there were, for example, a full matrix of targets (25), it is expected that all would be detected and located. Secondly, this property is a major one of interest for many correlator applications, and of course the reason the correlation plane can be calibrated. Thresholding is a tool which can be used to isolate targets. Finally, the edge effect is one of the major reasons for developing precise calibration for the correlation plane.

The line of targets in the calibration image of FIG. 10 was scanned in each of the orthogonal directions, including the edges.

Using the target spacing, the frame position was computed following the sequence of the Flowchart, FIG. 6. These are drawn at the frame position and can be seen to fall in positions of general uncertainty, demonstrating the importance of the calibration.

This test demonstrates that output correlation plane calibration has been successfully completed.

While several embodiments and variations of the present invention for a system for output plane calibration of an optical correlator are described in detail herein, it should be apparent that the disclosure and teachings of the present invention will suggest many alternative designs to those skilled in the art.

What is claimed is:

1. A method of calibrating the output correlation plane of an optical correlator for positional information to determine the position of an input image, in an input image plane, received by the optical correlator, wherein the optical correlator operates on the principle of projecting the Fourier transform of an input image onto at least one matched filter having recorded thereon the Fourier transform hologram of an image of interest, and then projecting the inverse Fourier transform of the correlated optical signal onto a detector to determine the correlation of the input image with the image of interest, comprising the steps of establishing a calibration image in the input image plane of the optical correlator which contains a two dimensional array of substantially identical targets positioned in symmetrically spaced x and y positions with respect to a first, horizontal axis and a second, vertical axis, with the precise location of each identical target in the input image plane being known utilizing at least one matched filter in the optical correlator having recorded thereon the Fourier transform hologram of the identical target, and correlating the output signals in the correlation plane to the positions of the two dimensional array of identical targets in the input image plane to calibrate the output correlation plane of the optical correlator for positional information.

2. A method of calibrating the output correlation plane of an optical correlator for positional information as claimed in claim 1, wherein said step of establishing a calibration image comprises establishing a calibration image having one identical image in the center of the input image plane, and a plurality of spaced identical images spaced along two orthogonal directions of the input image plane.

3. A method of calibrating the output correlation plane, of an optical correlator for positional information as claimed in claim 1, wherein said step of establishing a calibration image comprises establishing a calibration image having one identical image in the center of the input image plane, and a plurality of spaced identical images spaced along both the x and y axes of the input image plane.

4. A method of calibrating the output correlation plane of an optical correlator for positional information as claimed in claim 1, wherein said step of establishing a calibration image comprises establishing a calibration image having one identical image in the center of the input image plane, and a plurality of spaced identical images equally spaced along both the x and y axes of the input image plane.

5. A method of calibrating the output correlation plane of an optical correlator for positional information as claimed in claim 1, wherein said identical targets are identical images of an object encountered during actual industrial or commercial usage of the optical correlator, such that after the output correlation plane of the optical correlator has been calibrated for positional information to determine the position of an input image received by the optical correlator as specified herein, a change of the at least one matched filter is not required for actual industrial or commercial usage of the optical correlator, which eliminates misalignment problems caused by a change of matched filters.

6. A method of calibrating the output correlation plane of an optical correlator for positional information as claimed in claim 1, said step of utilizing at least one matched filter comprising utilizing a multiple matched filter, each having a different Fourier transform hologram recorded thereon.

7. A method of calibrating the output correlation plane of an optical correlator for positional information as claimed in claim 1, including testing the calibration results for linear and nonlinear relationships between images in the input plane and output signals in the output correlation plane.

8. An arrangement for calibrating the output correlation plane of an optical correlator for positional information to determine the position of an input image, in an input image plane, received by the optical correlator, wherein the optical correlator operates on the principle of projecting the Fourier transform of an input image onto at least one matched filter having recorded thereon the Fourier transform hologram of an image of interest, and then projecting the inverse Fourier transform of the correlated optical signal onto a detector to determine the correlation of the input image with the image of interest comprising:

a. a calibration image positioned in the input image plane of the optical correlator containing a two dimensional array of substantially identical targets, with the precise location of each identical target in the input image plane being known;

b. at least one matched filter in the optical correlator having recorded thereon the Fourier transform hologram of the identical target; and c. means for detecting the positions of the resultant optical signals in the output correlation plane;

d. means for correlating the detected positions of the resultant optical signals in the output correlation plane with the positions of the two dimensional array of identical targets in the input image plane to calibrate the output correlation plane of the optical correlator for positional information.

9. An arrangement for calibrating the output correlation plane of an optical correlator for positional information as claimed in claim 8, said calibration image comprising a calibration image having one identical image in the center of the input image plane, and a plurality of spaced identical images spaced along two orthogonal directions of the input image plane.

10. An arrangement for calibrating the output correlation plane of an optical correlator for positional information as claimed in claim 8, said calibration image comprising a calibration image having one identical image in the center of the input image plane, and a plurality of spaced identical images spaced along both the x and y axes of the input image plane.

11. An arrangement for calibrating the output correlation plane of an optical correlator for positional information as claimed in claim 8, said calibration image comprising a calibration image having one identical image in the center of the input image plane, and a plurality of spaced identical images equally spaced along both the x and y axes of the input image plane.

12. An arrangement for calibrating the output correlation plane of an optical correlator for positional information as claimed in claim 8, wherein said identical targets are identical images of an object encountered during actual industrial or commercial usage of the optical correlator, such that after the output correlation plane of the optical correlator has been calibrated for positional information to determine the position of an input image received by the optical correlator as specified herein, a change of the at least one matched filter is not required for actual industrial or commercial usage of the optical correlator, which eliminates misalignment problems caused by such a change.

13. An arrangement for calibrating the output correlation plane of an optical correlator for positional information as claimed in claim 8, said at least one matched filter comprising a multiple matched filter, with each matched filter having a different Fourier transform hologram recorded thereon.

* * * * *